United States Patent [19]

Wikoff

[11] 4,213,334
[45] Jul. 22, 1980

[54] TENSIOMETER

[75] Inventor: Mark W. Wikoff, Cincinnati, Ohio

[73] Assignee: Best & Donovan, Cincinnati, Ohio

[21] Appl. No.: 159

[22] Filed: Jan. 2, 1979

[51] Int. Cl.³ .............................................. G01L 5/06
[52] U.S. Cl. ..................................................... 73/144
[58] Field of Search ......................................... 73/144

[56] References Cited

U.S. PATENT DOCUMENTS

| 3,834,225 | 9/1974 | Burchett | 73/144 |
| 3,839,908 | 10/1974 | Casper | 73/144 |
| 3,864,953 | 2/1975 | Fletcher et al. | 73/143 |

*Primary Examiner*—Charles A. Ruehl
*Attorney, Agent, or Firm*—Wood, Herron & Evans

[57] ABSTRACT

A portable tensiometer for use in indicating a desirable level of tension in an endless band saw blade, the tension in that blade being adjustable by a separate tension device not connected with the tensiometer. The tensiometer includes first and second arms pivotally connected one with the other. Adjacent ends of the two arms are structured to receive the band saw blade and a portion of the saw's housing in seated relation to prevent significant slipping of the tensiometer in a path transverse to the normal travel path of the saw blade while the blade tension is being monitored. A spring connects the two arms so that the band saw blade is biased toward that portion of the saw's housing on which the tensiometer is seated during use of the tensiometer. A scale carried by one of the arms cooperates with an indicator carried by the other of the arms to inform the user when the desired tension on the band saw blade has been achieved.

10 Claims, 3 Drawing Figures

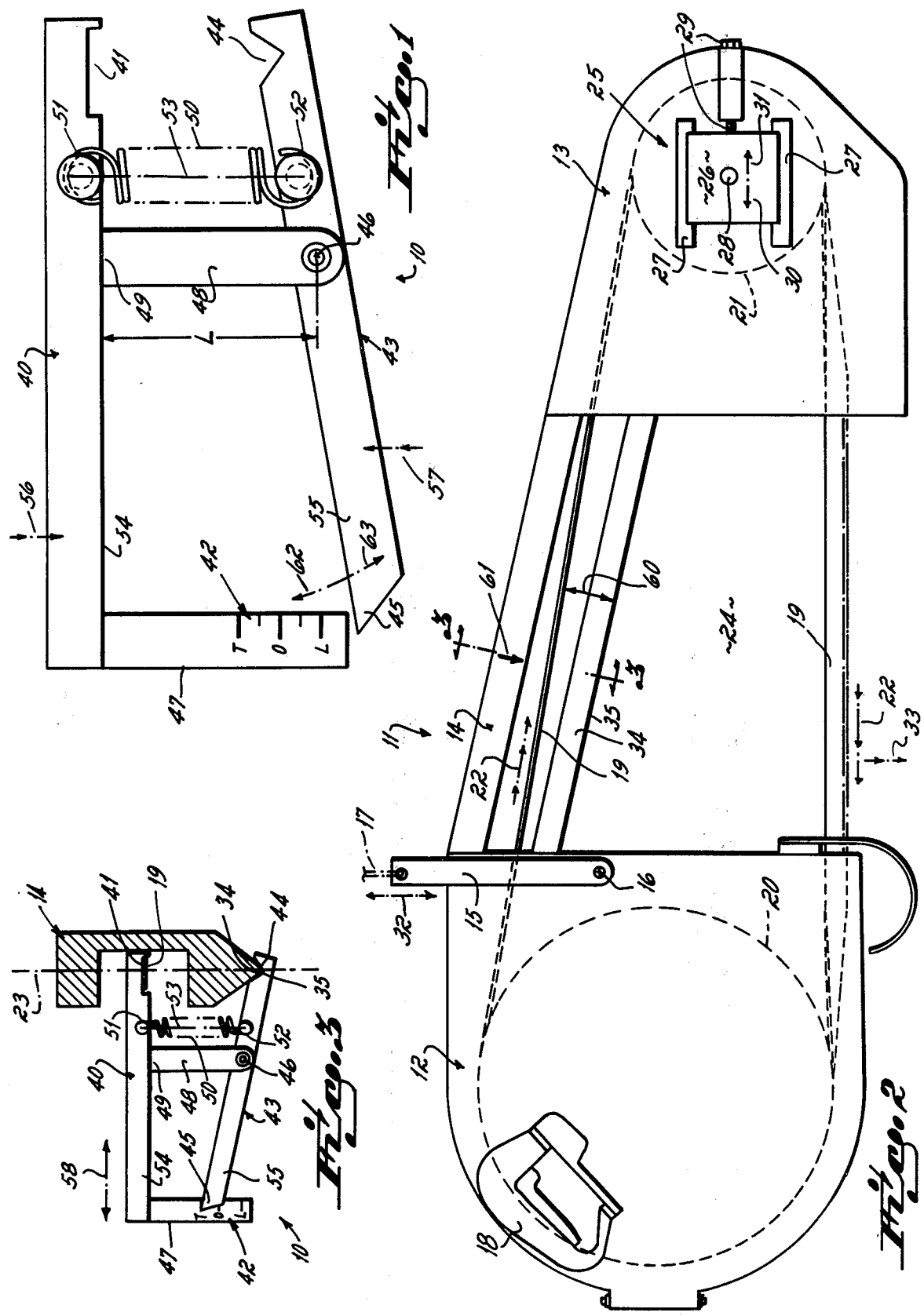

TENSIOMETER

This invention relates to tensiometers. More particularly, this invention relates to a tensiometer specially structured for use with a band saw and an endless band saw blade.

Band saws are, of course, very well known to the prior art. Basically, a band saw is comprised of a driven wheel and an idler wheel, the wheels being spaced one from another with an endless saw blade being carried on both of the wheels. A housing supports the driven end idler wheels in structural relation. Generally, a tension device is included which allows the wheels to be moved relative one to another for the purpose of adjusting the tension on the endless saw blade as desired by the user. Such band saws are quite well known in the woodworking industry. However, band saws are also known in the meat processing industry. In this latter connection, a novel and unique hand held band saw has been recently developed which is disclosed in detail in U.S. patent application Ser. No. 881,734, filed Feb. 27, 1978, and assigned to the assignee of this application.

In the hand held band saw for the meat processing industry referred to above, a blade tension device is used by which the tension on the endless blade can be adjusted as desired by the operator. This blade tension device is adjustable by rotation of a threaded bolt connected with a mounting plate on which the idler wheel is mounted, the mounting plate being movable relative to the saw's housing. This tension device, in the past, has been operated through use of a torque wrench that is set to give the tension desired in the endless saw blade. However, and under practical operating circumstances, substantial amounts of animal fat and grease are introduced into the saw housing and periodically this housing must be steam cleaned or sterilized. Hence, some of the time an operator may wish to reset the blade tension before the saw is cleaned, and some of the time an operator may wish to set the blade tension immediately after the saw is cleaned. But under these circumstances it has been found that, with the particular band saw structure shown in the patent application referred to, different actual blade tensions may arise depending on the cleanliness or not of the housing's interior even though the same torque setting is used on the torque wrench.

Accordingly, it has been a primary objective of this invention to provide an improved tensiometer particularly adapted for use with a band saw for the meat processing industry. In accord with this objective, a portable tensiometer has been invented which is particularly adapted for use in indicating a desirable level of tension in an endless band saw blade, the tension in that blade being adjustable by a separate tension device not connected with the tensiometer. The tensiometer includes first and second arms pivotally connected one with the other. Adjacent ends of the two arms are structured to receive the band saw blade and a portion of the saw's housing in seated relation to prevent significant slipping of the tensiometer in a path transverse to the normal travel path of the saw blade while the blade tension is being monitored. A spring connects the two arms so that the band saw blade is biased toward that portion of the saw's housing on which the tensiometer is seated during use of the tensiometer. A scale carried by one of the arms cooperates with an indicator carried by the other of the arms to inform the user when the desired tension on the band saw blade has been achieved. Also in accord with this objective, the improved method of establishing blade tension in a meat processing band saw includes the steps of continuously deflecting the band saw blade toward the housing of the band saw by use of a portable tensiometer partially seated on the blade and partially seated on the housing, adjusting the independent tension device for varying the tension on the endless blade as desired without manually maintaining the portable tensiometer in position on the blade and visually observing the tensiometer's scale and pointer until the desired tension has been achieved. This structure and method provides a simple portable tensiometer easily used by the saw's operator. The operator's hands need not be concerned with the tensiometer once it is attached between the blade and the housing because it is structured so that it remains attached after its use position has been established, thereby freeing the operator's hands for operating the saw's tension device while permitting him to visually observe the tensiometer's scale and pointer as the tension on the endless blade is varied to the operator's satisfaction.

Other objectives and advantages of this invention will be more apparent from the following detailed description taken in conjunction with the drawings in which:

FIG. 1 is a side elevational view of a portable tensiometer in accord with the principles of this invention;

FIG. 2 is a partially broken away side view illustrating a hand held band saw of the type with which the tensiometer of this invention is structured for use; and FIG. 3 is a cross sectional view taken along line 3—3 of FIG. 2, and illustrating the tensiometer of this invention in operative relation with the band saw illustrated in FIG. 2.

The portable tensiometer 10 of this invention is adapted for use with a band held band saw 11 of the type basically illustrated in FIG. 2. The band saw 11 illustrated in FIG. 2 is more particularly described in U.S. patent application Ser. No. 881,734, filed Feb. 27, 1978, and the description of the band saw in that earlier filed application is incorporated herein by reference. The hand held band saw 11 is particularly useful in the meat processing industry in the processing of newly slaughtered cattle.

The hand held band saw 11 includes a housing comprised of a driven wheel section 12, an idler wheel section 13, and a cross bar section 14 that rigidly connects sections 12, 13. A connector bar 15 is pivotally mounted to the driven wheel section 12 on pivot axis 16, a cable hook 17 being receivable in the connector bar's hole to support the saw from an overhead support, e.g., a counter-balance mechanism (not shown). A handle is provided on each side of the driven wheel section 12 (only one handle 18 of which is shown) for grasping by the saw's operator so as to manually manipulate the saw 11 as desired. An endless length saw toothed blade 19, i.e., a saw blade in closed loop configuration, is engaged in friction drive relation with driven wheel 20 in the housing's driven wheel section 12, and with idler wheel 21 in the housing's idler wheel section 13. The driven wheel 20 is connected through a drive train (not shown) to a drive motor (not shown) so as to continuously drive the endless saw blade 19 in the direction of arrow 22. The endless saw blade 19 is adapted to cooperate with tracking assemblies (not shown) within the housing's sections 12, 13 for translating the blade into a planar attitude parallel to the median longitudinal plane 23 of the housing's sections 12-14 as the blade traverses throat 24 of the saw 11. In other words, the tracking assemblies (not shown) translate the blade 19 from the normal band attitude (in which the blade is disposed normal to the housing's median plane 23 as shown in FIGS. 2 and 3) into the cutting attitude (in which the band is parallel to the housing's median plane 23 as shown in FIG. 2 only).

The hand held band saw 11 also includes a blade tension device 25 which is adjustable by the saw's operator from the exterior of the housing's section 13 so as to provide the correct blade tension on the endless blade 19 during operation of the saw. The saw's tension device 25 includes movable plate 26 received on rails 27 fixed to the housing's idler wheel section 13. The idler wheel 21 is mounted on that plate 26 through shaft 28. Movement or adjustment of the idler wheel 21 is achieved through use of adjustment bolt 29 threadedly engaged with the movable plate 26 so that rotation of the bolt in one direction or the other moves the plate and, therefore, the idler wheel, in the direction shown by phantom arrows 30 or 31.

In use by an operator, the saw 11 may be connected with an overhead support (not shown) by a cable and hook 17 attached to the saw's housing through connector bar 15. The overhead support (not shown) may be in the nature of a counter-balance mechanism (not shown) which aids the operator in manipulating the saw in an up and down direction illustrated by phantom arrow 32. If so supported, the saw 11 is hand manipulatable or orientable as the operator grips the handles (only one handle 18 of which is shown), thereby permitting the spatial orientation of the saw to be as desired by the operator. With the saw blade 19 continuously running in the direction illustrated by phantom arrow 22, and oriented in a generally horizontal plane relative to floor level, the saw 11 can be simply moved down through an animal carcasses' backbone in a direction illustrated by phantom arrow 33 from the upper or tail end of that carcass to the lower or shorter end of that carcass so as to split the carcass into right and left hand sections as that carcass hangs down from an overhead conveyor. When used in this manner, V-shaped nose 34 (see FIG. 3) on the inside throat edge 35 of the housing's crossbar section 14 allows the opposed carcass halves to be deflected away from the line of cut. This tension device 25 for the endless blade 19, and the saw 11 itself, is more particularly set out in applicant's pending application Ser. No. 881,734, filed Feb. 27, 1978, the disclosure of which is incorporated herein by reference.

The portable tensiometer 10 is especially structured for use with this hand held band saw as illustrated in detail in FIG. 1. As shown in that figure, the tensiometer 10 includes a generally linear first arm 40 having a groove 41 at one end to receive the saw blade 19 in seated relation (see FIG. 3), and having indicator indicies in the form of scale 42 on scale arm 47 extending at generally right angles from the other end. The tensiometer also includes a generally linear second arm 43 having a groove 44 at one end to receive the nose portion 34 of the housing's cross bar section 14 in seated relation (see FIG. 3), and having a pointer 45 at the other end. The first 40 and second 43 arms are pivotally connected together intermediate the ends thereof as on pivot axis 46 so that the grooves 41, 44 ends are adjacent, and so that the pointer 45 cooperates with the scale 42 on scale arm 47. This pivot 46 connection is established by spacer arm 48 fixed at one end as at 49 to the first arm 40, and pivotally connected at the other end as at 46 to the second arm 43, the spacer arm 48 being oriented generally parallel to the scale arm 47. A tension spring 50 connects the two arms 40, 43 so the adjacent groove 41, 44 ends of the two arms are continuosly spring loaded toward one another. In this structure, one end of the tension spring 50 is connected as at 51 to the first arm 40 between its seat 41 and the spacer arm 48, and the other end of that tension spring is connected as at 52 to the second arm 43 between its seat 44 and the spacer arm 48, the axis 53 of the spring being oriented generally parallel to the spacer arm 48. The scale 42 on scale arm 47, as indicated in FIG. 1, illustrates a zero for normally preferred tension for the saw blade, a T for tight tension on the saw blade, and an L for loose tension on the saw blade.

In use, the two arms 40, 43 are initially pivoted relative one to another against the tension of the tension spring 50 through manually grasping the handle end 54, 55 of each arm. When suitably opened, the groove 41 of the first arm 40 is seated on the saw blade 19, and the groove 44 of the second arm 43 is aligned with the nose 34 of the housing's cross bar section 14 as illustrated particularly in FIG. 3. After properly aligning the tensiometer 10 the manual force (shown by phantom arrows 56, 57 in FIG. 1) is released, thereby connecting the tensiometer with the blade 19 and the housing's cross bar section 14 in a plane generally perpendicular to the travel path 22 of the saw blade due to tension spring 50. Once seated in operational relation with the saw blade 19 and the housing's cross bar section 14, the tensiometer cannot fall off or become inadvertently removed therefrom because of spring 50 tension. This for the reason that the blade groove 41 in the first arm 40 receives the saw blade therein, and the housing groove 44 in the second arm 43 receives V-shaped nose 34 of the saw's crossbar section 14 therein, which in combination with the tension spring 50 minimizes the possibility of the tension gauge 10 becoming disengaged from the saw blade 19 or the crossbar section 14 in response to a force on the tension gauge normal to the travel direction path 22 of the saw blade as shown by phantom arrow 58 in FIG. 3. In other words, and once seated in operational relation with the saw blade 19 and the crossbar section 14, the tension gauge will not inadvertently become dislodged therefrom. Further, the length L of spacer arm 48 accommodates the tensiometer 10 to the relatively wide gap between endless blade 19 and the crossbar section's mouth edges 35 as shown in FIG. 3.

Note that, in the band saw 11 shown in the Figures, the saw blade 19 runs at a slightly acute angle 60 relative to the mouth edge 35 of the saw housing's crossbar section 13 in that location where the tensiometer 10 is to be assembled to operational relation. Thus, a bench mark 61 is established on the crossbar section 13 so as to properly position the tensiometer 10 in the desired location on the saw housing section 13 relative to the strength of the tensiometer's tension spring 50. With the tensiometer 10 assembled with the band saw 11 as shown in FIG. 3 at the bench mark 61 location, the operator may thereafter adjust the tension on the blade 19 through use of the tension device 25 by adjustment of screw 29. In other words, the saw's operator may use both hands to adjust the tension device 25 for varying the tension on the endless blade 19. As the tension imposed on the endless blade 19 is increased, the pointer 45 on the second arm 43 will pivot from the L position on the scale 42 toward the T position on the scale in the direction shown by phantom arrow 62, and as the tension imposed on the endless blade 19 is decreased, the pointer 45 will move in the direction shown by phantom arrow 63 relative to the scale. In this way, therefore, the saw's operator can adjust the tension device 25 while visually observing the independently connected portable tensiometer 10 to determine when the desired tension level on the endless saw blade 19 has been reached.

An alternative method to achieve a preferred and pre-set tension on the endless saw blade contemplates use of indicator indicia in the form of bench mark (not shown) only on the scale arm 47 in place of scale 42, and use of a scale (not shown) on the housing's crossbar section 14 in place of bench mark 61. The tensiometer 10 would be positioned at the high, intermediate, or low end of the scale (not shown) on the crossbar section 14, as desired by the saw's operator, and the tension on the endless saw blade 19 then would be adjusted by the tension device 25 until the pointer 45 on the second arm 43 indicates the bench mark (not shown) on the scale arm 47. This second tension adjustment method is obtainable with the tensiometer 10 and with band saw 11 because the endless blade 19 defines an acute angle 60 relative to the mouth edge 35 of the crossbar section. This causes the tension spring 50 to introduce less spring bias on the blade 19 when it is connected at a location to the left of the bench mark 61 shown in FIG. 2, and more spring bias on the blade when it is connected to the right of the bench mark shown in FIG. 2, because of the angulation of the blade relative to the immobile mouth edge 35 as shown in that figure.

Having described in detail the preferred embodiment of my invention, what I desire to claim and protect by Letters Patent is:

1. A portable tensiometer for use with a band saw, said tensiometer comprising
   a first arm having indicator indicia at one end, and a second arm having a pointer at one end, said first and second arms being pivotally connected together intermediate the ends thereof so that said pointer cooperates with said indicator indicia,
   first joinder means for connecting the other end of said first arm with said saw's blade, said first joinder means preventing relative motion between said arm and said blade in a direction normal to the travel path of said blade when said tensiometer is in operational relation with said band saw,
   second joinder means for connecting the other end of said second arm with said saw's housing, said second joinder means preventing relative motion between said second arm and said housing in a direction normal to the travel path of said blade when said tensiometer is in operational relation with said band saw, and
   a spring connecting said two arms together one with another so that the first and second joinder means of said two arms are continuously spring loaded toward one another when assembled in operational relation with said band saw, said spring functioning to releasably connect said tensiometer with said saw's housing and said blade for connecting said blade and said tensiometer in operational relation, and functioning to deflect said blade toward that portion of said housing to which connection is effected for determining the tension in said blade through use of said indicator indicia and said pointer.

2. A portable tensiometer as set forth in claim 1, said first joinder means comprising a groove structured to receive said endless saw blade in seated relation, and said second joinder means comprising a groove adapted to receive a portion of said saw's housing in seated relation.

3. A portable tensiometer as set forth in claim 1, said tensiometer further comprising
   a spacer arm immobily connected at one end to said first arm, and pivotally connected at the other end to said second arm, said spacer arm permitting said tensiometer to span the gap between said endless saw blade and that portion of said housing to which said second arm is connected while retaining pivotability of said second arm relative to said first arm.

4. A portable tensiometer as set forth in claim 3, said spacer arm being of a length approximately equal to the length of that gap between said endless saw blade and that portion of said housing to which said second arm is connected.

5. A portable tensiometer as set forth in claim 4, said first and second arms being generally linear.

6. A portable tensiometer as set forth in claim 1, said indicator indicia being in the nature of a scale to indicate the tightness or looseness of said band saw blade upon adjustment.

7. A portable tensiometer as set forth in claim 6, said scale being located on a scale arm connected to said first arm.

8. A portable tensiometer as set forth in claim 1, said spring being a tension spring.

9. A portable tensiometer as set forth in claim 1, said tensiometer being adapted for use with a band saw having an endless blade disposed at an acute angle relative to that portion of said housing to which said second arm is connected.

10. A portable tensiometer as set forth in claim 9, said housing portion incorporating a bench mark indicating the position at which said tensiometer is to be operationally connected with said saw blade.

* * * * *